No. 748,601. PATENTED JAN. 5, 1904.
W. GILES.
FODDER FORK.
APPLICATION FILED JUNE 6, 1903.
NO MODEL.

Witnesses
Inventor
Wm. Giles
Attorneys

No. 748,601. Patented January 5, 1904.

UNITED STATES PATENT OFFICE.

WILLIAM GILES, OF AMARILLO, TEXAS.

FODDER-FORK.

SPECIFICATION forming part of Letters Patent No. 748,601, dated January 5, 1904.

Application filed June 6, 1903. Serial No. 160,448. (No model.)

*To all whom it may concern:*

Be it known that I, WILLIAM GILES, a citizen of the United States, residing at Amarillo, in the county of Potter, State of Texas, have invented certain new and useful Improvements in Fodder-Forks; and I do hereby declare the following to be a full, clear, and exact description of the invention, such as will enable others skilled in the art to which it appertains to make and use the same.

This invention relates to pitchforks, and more particularly to that class employed for handling fodder or other materials in bundles, the object of the invention being to provide a cheap and simple style of fork which will hold the bundles in such a manner that they will not turn, but may be readily forked.

Figure 1:
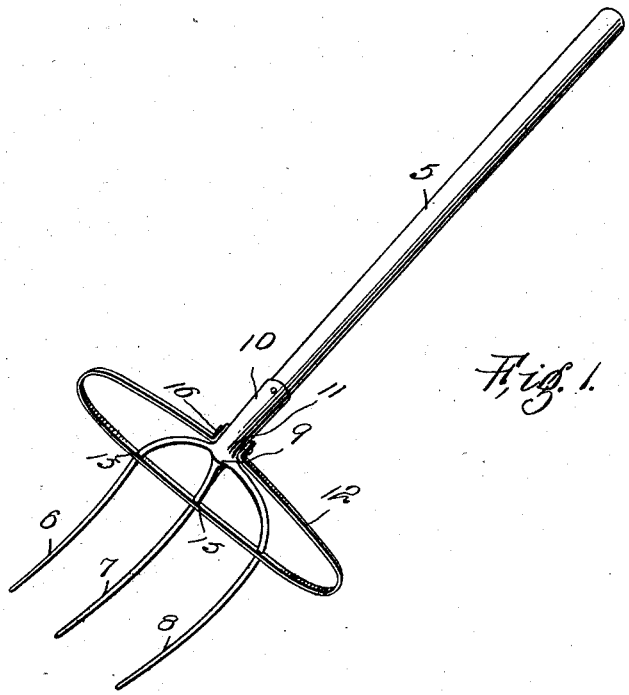
Figure 2:
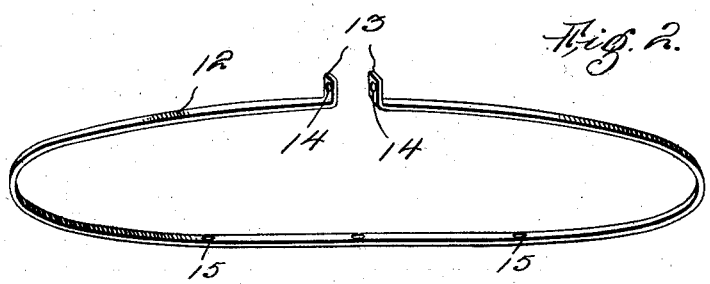

In the drawings forming a portion of this specification, and in which like numerals of reference indicate similar parts in both views, Figure 1 is a perspective view showing a fork embodying the present invention. Fig. 2 is a detail perspective view of the guard.

Referring now to the drawings, the present fork comprises a handle 5, to which the head of the fork is connected in the usual manner. The head of the fork consists of the three tines 6, 7, and 8, which are parallel at their front portions and of arc shape, the rear end portions of the outside tines 6 and 8 being curved inwardly to form a connecting bight portion 9, at the center of which is connected the tine 7. From the bight portion 9 extends the stem 10, which is engaged in the handle. This portion of the fork is of the same general form as the ordinary fork, with the exception that the tines are shorter and they are not tapered toward their free ends.

Through the stem 10, directly in the rear of the bight 9, is formed an opening 11 for attachment of the ends of the guard, as hereinafter described.

The guard consists of a metal bar 12, which is bent into elliptical shape, and the ends of which bar are brought together at one side of the ellipse and turned outwardly to form ears 13, which have alining perforations 14. Through the opposite side of the ellipse are formed perforations 15.

In the application of the guard the tines 6, 7, and 8 are engaged through the corresponding perforations 15, and the elliptical frame or guard is drawn rearwardly of the tines, so that the stem 10 of the fork is received between the ears 13, after which a bolt 16 is passed through the perforations of the ears and through the opening 11, so that the ears are clamped securely to the stem of the fork.

In the use of the fork the bundle lies against the guard and is held securely upon the fork during the manipulation of the latter.

In practice modifications of the specification construction shown may be made and any suitable materials and proportions may be used for the various parts without departing from the spirit of the invention.

What is claimed is—

1. A pitchfork comprising a head including tines and a stem, and a guard consisting of a loop having its ends secured to the stem and having perforations through one side through which the tines are engaged, said loop projecting laterally beyond the outside tines.

2. A pitchfork comprising a head including tines and a stem, the latter having an opening therethrough, and a guard consisting of a loop having perforations in one side through which the tines are removably engaged, the ends of the loop being disposed against the stem and having perforations alining with opening through the stem, and securing means engaged through said perforations and opening.

In testimony whereof I affix my signature in presence of two witnesses.

WILLIAM GILES.

Witnesses:
S. H. MADDEN,
J. N. BROWNING.